O. T. ZINKEISEN & R. N. RIDDLE.
MIXER, RETORT, AND DIGESTER.
APPLICATION FILED JULY 14, 1911.
1,086,432.
Patented Feb. 10, 1914.
2 SHEETS—SHEET 1.
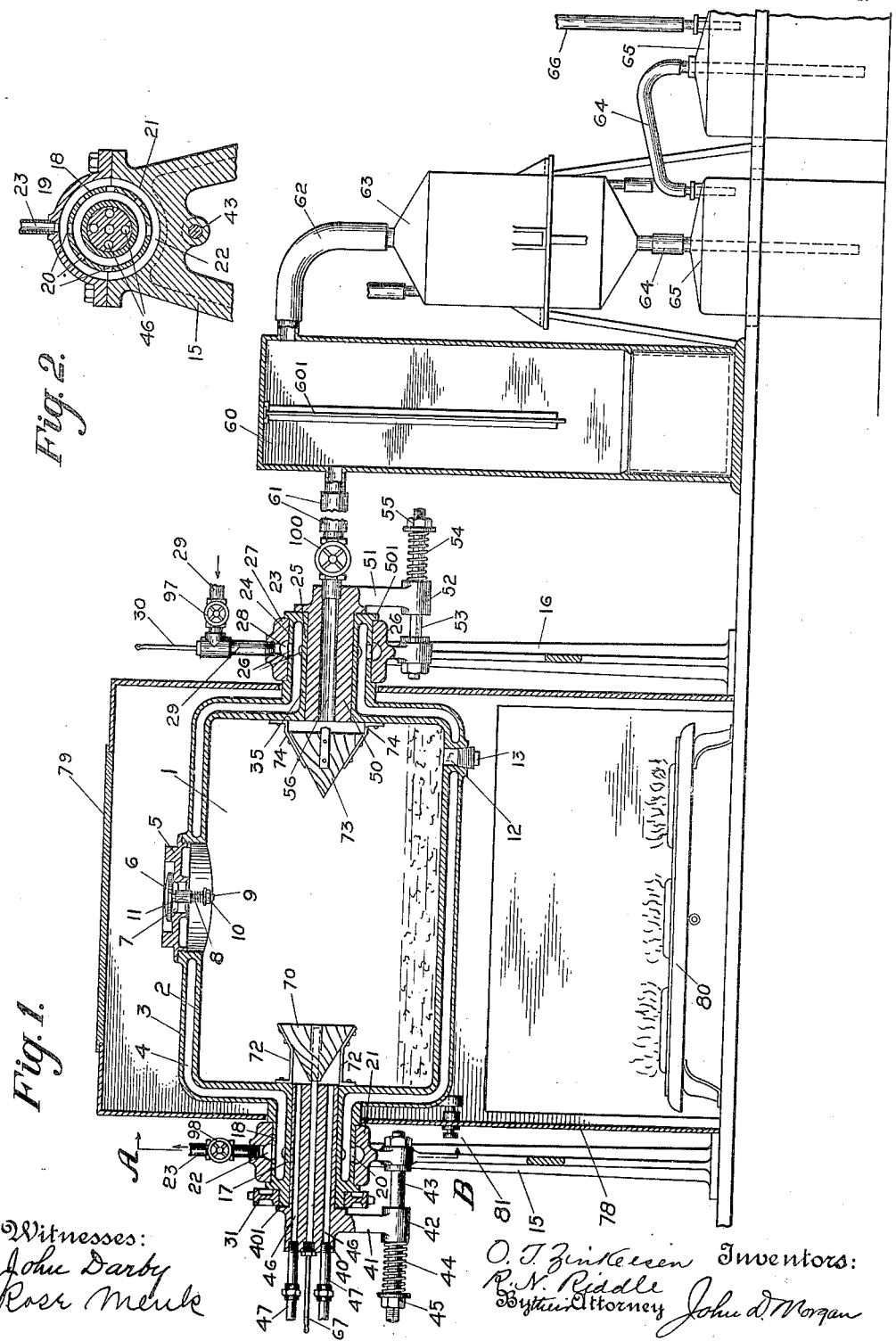

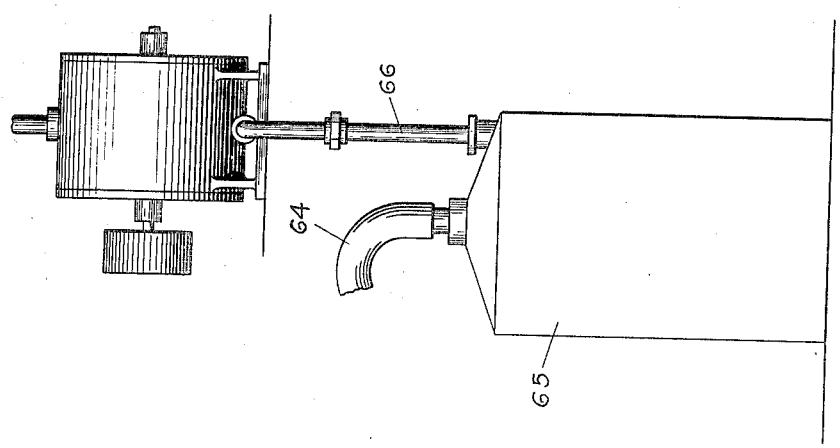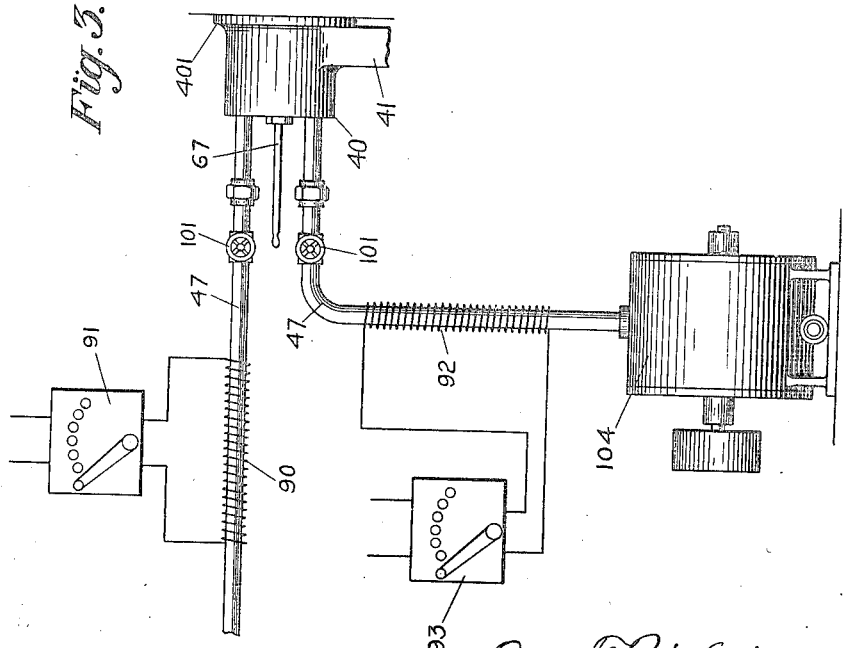

UNITED STATES PATENT OFFICE.

OSCAR T. ZINKEISEN, OF NEW YORK, N. Y., AND ROBERT N. RIDDLE, OF RAHWAY, NEW JERSEY; SAID RIDDLE ASSIGNOR TO SAID ZINKEISEN.

MIXER, RETORT, AND DIGESTER.

1,086,432.  Specification of Letters Patent.  Patented Feb. 10, 1914.

Application filed July 14, 1911. Serial No. 638,594.

*To all whom it may concern:*

Be it known that we, OSCAR T. ZINKEISEN, a citizen of the United States, residing in the city of New York, State of New York, and ROBERT N. RIDDLE, a citizen of the United States, residing at Rahway, State of New Jersey, have invented certain new and useful Improvements in Mixers, Retorts, and Digesters, of which the following is a specification.

The invention relates to apparatus for use in industrial chemistry and other technicological work.

More especially the invention relates to apparatus for mixing, distilling or digesting chemical or physical materials whether gaseous, liquid or solid, and for properly disposing of the products.

Objects of the invention are to produce novel devices for thoroughly mixing the substances or agents which are to react together in the processes to be carried out.

More particularly, one object of the invention is to thoroughly mix gases entering a rotating drum with substances or agents located within said drum; to provide for accurate temperature control of neutral gases, or other fluids entering the drum or container, so that fractional distillation may be effected followed by proper treatment of the residue to secure the desired effect thereon; to provide for accurate pressure variations within the drum or container in connection with the other functions and facilities enumerated; to provide for successive operations of different kinds upon materials produced in or introduced into the drum or container without removal thereof to new apparatus; to provide apparatus which may be used successively or as desired for various operations such as mixing materials to bring about or assist chemical reactions, to distil or digest or otherwise treat the materials operated on; to provide for a constant and uniform lateral or transverse progression and spread of gases entering a rotating drum near its axis of rotation in order to mix said gases together, or to mix them with substances or agents within the drum; to provide novel devices for rapidly conducting successive processes or operations upon materials or residues without handling or conveying same, and conveniently disposing of the final resulting products. These and other objects of invention will in part be obvious and will in part more fully appear herein.

The invention consists in the novel parts, arrangements, constructions, improvements and combinations, herein shown and described.

The accompanying drawings referred to herein and forming a part hereof, illustrate one embodiment of the invention, the same serving in connection with the description herein to explain the principles of the invention.

Of the drawings: Figure 1 is a transverse central section of an apparatus constructed in accordance with the principles of the invention; and Fig. 2 is a fragmentary detail, in section, on the line A—B of Fig. 1, looking in the direction of the arrows.

Referring to the accompanying drawings, illustrating by way of example one embodiment of the invention, a rotating drum, or container, preferably of cylindrical form is provided. Said drum or container may be jacketed in any suitable manner, and is shown herein with double walls 2 and 3, forming a space 4 therebetween through which space steam or hot water or some other suitable medium or agency, may be supplied or circulated. Said drum 1 is shown provided with a hand-hole or manhole closed with a suitable cover 5, which may be screw-threaded into its opening or secured therein in some other suitable manner. Said cover 5 in the present embodiment is provided with a relief valve 6 closing an orifice 7 in said cover and being held to its seat by a spring 8 acting between the nut 10 on the valve stem 9 and the apertured web 11 through which the valve stem passes. The nut 10 serves to regulate the pressure at which the valve will blow off. There is also shown a draining orifice 12 fitted with a screw plug 13.

Suitable means are provided for rotatably mounting said drum or container so that it may rotate freely, and have the requisite heating fluid supplied to the space 4, and also have the gases pass into the interior of the container, and to have the gaseous or vaporous products of any re-action or process withdrawn therefrom. As embodied, said drum 1 is provided with trunnions or hubs journaled in suitable supports 15 and 16. The receiving end in the present embodiment is at the left (referring to Fig. 1)

and the trunnion or hub 17 is shown double-walled like the walls of the drum or container, thereby forming a similar space between its walls, said space communicating with or being continuous with the space 4. The outer wall 18 of said trunnion or hub 17 is provided with a plurality of orifices 20 arranged in annular series about the hub. The journal bearing 21, carried upon or integral with its support 15, is provided with an annular groove 22 in alinement with said orifices 20. Into said annular groove 22 opens a pipe 23 through which the heating fluid is either supplied or carried away. At the opposite end of the drum 1 the trunnion or hub 35 is of generally similar structure having the double walls 24 and 25, the outer wall 24 having an annular series of perforations 26 therein. The bearing 27 is provided with an annular groove 28 in register with said perforations. A pipe 29 opens into said groove to either supply or carry away fluid as may be desired. In the illustrated embodiment, the fluid is indicated running in through the pipe 29 and out through the pipe 23, having circulated in the meantime through the entire space 4 which surrounds the drum or container. If desired, a thermometer 30 may be introduced into the pipe 29 to indicate the temperature of the circulating fluid. A sprocket wheel 31 is shown fixed to the hub 17 for the purpose of rotating the drum.

The gases or other fluids are introduced at the left hand end of the drum, referred to Fig. 1, and for this purpose the hub 17 is shown hollow with a core 40 bushed therein, said core being held against rotation by suitable means such as an arm 41 integral therewith, and having its end 42 apertured and passing over a pin 43 projecting from the support 15. A spiral spring 44 is shown about the pin 43 and acting between the end 42 of the arm 41 and a nut 45 threaded upon the end of the pin 43, to press shoulder 401 on core 40 against hub 17 to make a tight joint. The conduits for the entering fluids pass through said core 40, and are shown as four in number, being indicated by the reference numeral 46. Suitable tubes or pipes 47 communicate between said conduits and any suitable source of gas or other fluid supply.

The gaseous or other fluid products of the action taking place within the drum or container are conducted away through the other hub 35 which is likewise hollow. Bushed within said hub 35 is a core 50 held from rotation by an arm 51 having its end 52 apertured and encircling a rod 53. A spring 54 acts between said end 52 and a nut 55 on the rod 53 in a manner already described, to press shoulder 501 against hub 35 to make a tight joint. Within the core 50 is an aperture 56 providing egress for the gases or other fluids from the drum or container 1. Such gas or fluid is led away to any suitable means, so far as concerns many features of the invention. In the present embodiment a dust collector 60 is shown from which the pipe 61 communicates to the aperture 56. Within the chamber 60 is shown a screen or baffle plate 601, which throws down any dust or solid, or liquid, matter which may have come over from the container. Communication is had from the dust collecting chamber 60 to a condenser 63, or where said dust chamber is omitted, direct from the container, by means of a pipe or tube 62. Suitable pipes 64 may connect from the condenser receivers 65, and suitable connections 66 to a vacuum pump (not shown) may also be provided.

A thermometer may be provided for indicating the temperature in the interior of the drum or container 1, and it may be inserted through an orifice in either of the cores 40 or 50. In the illustrated embodiment a thermometer 67 is shown projecting inwardly through the core 40.

Means are provided by the invention for spreading or distributing the gas or other fluid entering the container 1 through all parts thereof, the gas or fluid being prevented from going straight across from the ingress orifices to the egress orifice, but being thrown out radially or otherwise transversely. This will serve to mix thoroughly together a plurality of gases or other fluids entering through the ingress tubes, as well as to mix one or more gases or fluids so entering with the contents of the container 1. The embodied form of such means comprises a deflecting or distributing device located within the drum at the end of the conduits 46. Said spreading or distributing device may be in the form of a disk, but it is preferably in the form of a cone 70 having its apex toward and adjacent to the orifice or orifices 46, and its axis substantially concentric with that of the drum or container 1. The surface of this cone may be plain, but is preferably corrugated or fluted, said corrugations or flutings preferably being of helical form and turning from the apex in the direction opposite to that in which the container 1 is rotated. Suitable supports 72 are provided for holding the cone 70 firmly in position.

Means are provided by the invention for preventing solid matter in the container from entering the egress orifice 56, and so far as concerns certain features of the invention, such device or means may comprise a plate within the drum supported in front but spaced away from the entrance to the conduit or orifice 56. The preferred form of said device consists of a cone 73 having its base toward but spaced away from the entrance to the orifice 56, and having its axis preferably substantially concentric with that of the drum or container 1. Said cone 73 may be supported in position by the arms 74. It will thus be seen that when the drum or container 1 is rotating and also when the drum is left standing the gas, gases or fluids entering near its axis cannot merely flow along in the general direction of said axis to the exit conduit or orifice in a sort of core or column, but are transversely deflected in all directions and thrown into all parts of the drum 1, and caused to mix thoroughly with each other or with other gases or liquids or solids contained in said drum. The cone 73 also conduces toward the foregoing results but more especially guards the entrance to the orifice 56 against the entrance of powder or comminuted substances carried within the drum 1.

In the present embodiment the drum 1 is located within a casing 78 of suitable non-conducting material, which casing fits closely about the hubs 17 and 24, and is provided with an opening at the top fitted with a closure 79. Suitable heating devices 80 are provided within the casing 78 for distilling or digesting any residue or other contents of the drum or container 1. A suitable holding device 81 may be employed for preventing rotation of the drum or container 1 when so desired.

It will thus be seen that the apparatus may be used for a variety of purposes, or it may be used for a succession of different operations such as replacement, distillation, digestion, various substances introduced thereinto or resultant or residual from the processes and materials employed.

The temperature of the gases entering the container 1 may be carefully regulated and the embodied form of such means comprises a heat coil 90 arranged about a gas carrying pipe 47 and having a resistance 91 to control the heating action of the coil. A similar heating coil 92 is shown applied to another of the pipes 47 and having a resistance 93 to control the heating of the coil. If desired, common heating means for all said gas pipes may be provided, or the temperature of each pipe and its gas may be separately controlled. It will be understood that so far as concerns many aspects of the invention, any suitable heating agent or heating means, or other temperature controlling agent or means may be employed in the temperature controlling device.

Means are provided by one feature of the invention for regulating the temperature of the drum or container by means of the fluid circulated between the walls of the drum or container 1. In connection with the embodied form said means comprises a valve 97 in pipe 29 and a valve 98 in pipe 23, whereby the flow of temperature regulating fluid between the walls of the container can be effectively and accurately regulated.

In accordance with one feature of the invention means are also provided for regulating the pressure within the drum or container 1. In the embodied form of such means, a valve 100 is located at the egress end of the container to shut off wholly or partly the exit passage from the container. A valve 101 is located at the entrance end for each pipe 47. A suitable pumping or other pressure creating device 104 may be employed to force the gas or other fluid in against the pressure in the container 1.

It will be understood that the apparatus possesses an extraordinary range of capabilities and adaptability in connection with processes involved in manufacturing or industrial chemistry, and that the various devices communicating with each other and co-operating one with another, permit great variety and latitude in successive or continuous operations upon the same material. By way of further explanation, the apparatus is well adapted for the introduction of neutral gases under temperature control so that fractional distillation can be effected through and by the aid of such control of the gases entering and the residue may also be handled under such careful and accurate temperature control as not to be impaired in anywise, as in the case of wood distillation, the wood itself will not be charred.

What we do claim as our invention and desire to secure by Letters Patent, is:—

1. In an apparatus of the kind described, the combination with a closed rotary container, of a conduit for admitting fluid at one of the axial bearings of said container, said conduit terminating substantially at its point of entry into the container, and a spreading device located within said chamber in front of but separated from said conduit opening and having a surface diverging away from said opening for spreading said fluid transversely to all parts of the container.

2. In an apparatus of the kind described the combination with a closed rotary container, of a conduit for admitting fluid at one of the axial bearings of said container, said conduit terminating substantially at its point of entry into the container, and a spreading device located within said chamber in front of but separated from said conduit opening and having a surface diverging away from said opening for spreading said fluid transversely to all parts of the container, the central portion of said container being open space free from obstruction.

3. In an apparatus of the kind described the combination with a closed rotary container of a conduit for admitting fluid at one of the axial bearings on said container, said conduit terminating substantially at its point of entry into the container, and a spreading device mounted upon and within said chamber in front of but separated from said conduit opening and having a surface diverging away from said opening for spreading said fluid transversely to all parts of the container.

4. In an apparatus of the kind described, the combination with a closed substantially cylindrical rotary container having its axis of rotation coinciding with its cylindrical axis, of a conduit for admitting fluid at one end of the axis of said container, said conduit terminating adjacent to its point of entry into said container, means located adjacent to the terminus of said conduit for spreading the fluid transversely to all parts of the container, an egress conduit opening from the other end of the axis of said container, and means contiguous to the mouth of said egress conduit for preventing solids from the container entering said egress conduit while permitting fluids to enter said egress conduit, the central portion of said container being open space free from obstruction.

5. In an apparatus of the kind described, the combination with a closed rotary container, of a conduit for admitting fluid at one of the axial bearings of said container, said conduit terminating substantially at its point of entry into the container, and a spreading device mounted upon and within said chamber in front of but separated from said conduit opening and having a surface diverging away from said opening for spreading said fluid transversely to all parts of the container, the central portion of said container being open space free from obstruction.

6. In an apparatus of the kind described the combination of a closed substantially cylindrical rotary container having its axis of rotation arranged horizontally and coinciding with its cylindrical axis, of a conduit for admitting fluid at one end of the axis of said container, said conduit terminating adjacent to its point of entry into said container, means located adjacent to the terminus of said conduit for spreading the fluid transversely to all parts of the container, an egress conduit opening from the other end of the axis of said container, and means contiguous to the mouth of said egress conduit for preventing solids from the container entering said egress conduit while permitting fluids to enter said egress conduit, the central portion of said container being open space free from obstruction.

7. In an apparatus of the kind described, the combination with a closed rotary container, a conduit for admitting fluid at one of the axial bearings of said container and terminating substantially at its point of entry into said container, and a cone shaped member within said container and having its apex adjacent to and turned toward said conduit whereby the entering fluid impinges upon the surface of said member and is thereby deflected and distributed to all parts of said container.

8. In an apparatus of the kind described, the combination with a closed rotary container, a conduit for admitting fluid at one end of the axis of said container, said conduit terminating just within said container, and a cone shaped member within said container and having its apex turned toward and closely adjacent to said conduit, whereby the entering fluid impinges against the surface of said member and is thereby deflected and distributed to all parts of said chamber, the body of said container being open space free from obstructions.

9. In an apparatus of the kind described, the combination with a closed rotary container, a conduit for admitting fluid at one end of the axis of said container, said conduit terminating just within said container, and a cone shaped member within said container and having its apex turned toward and closely adjacent to said conduit whereby the entering fluid impinges against the surface of said member and is thereby deflected and distributed to all parts of said chamber, the body of said container being open space free from obstructions, an egress conduit opening out of the wall of said container substantially opposite said fluid admitting conduit, and a cone shaped member having its base in front of and adjacent to but spaced away from said egress orifice and its apex pointing outwardly into the interior of said container.

10. In an apparatus of the kind described, the combination with a closed rotary container, a plurality of ingress conduits at one end of the axis of said container, a cone shaped member located within said container adjacent to the ends of said conduits, whereby the fluids entering through said conduits impinge upon the surface of said member and are thereby deflected and distributed throughout the interior of said container.

11. In an apparatus of the kind described, the combination with a closed rotary container, a plurality of ingress conduits at one end of the axis of said container, said conduits terminating just within said container, and a cone shaped member located within said container adjacent to and having its apex toward said conduits, whereby the fluids entering through said conduits impinge upon the surface of said cone and are thereby deflected and distributed transversely throughout the interior of said container, and a conduit at the opposite end of the axis of said container for conveying away a fluid, the body of the container being open space free from obstructions.

12. In an apparatus of the kind described, the combination with a closed rotary container, a plurality of conduits arranged about one end of the axis of said container, a cone shaped member within said container and having its apex substantially concentric with the axis of said container and adjacent to the ends of said conduits.

13. In an apparatus of the kind described, the combination with a closed rotary container having double walls with a space between, a double walled hub at the end of the axis of said container, and its interior communicating with the space between the container walls, a support upon which said hub is journaled, said support having an annular space formed therein, and the exterior wall of said hub having an opening therein in alinement with said annular space, and a conduit for supplying fluid to said annular space.

14. In an apparatus of the kind described, the combination with a closed rotary container having double walls with a space between, double walled hubs at the ends of the axis of said container, and with their interiors communicating with the space between the container walls, supports upon which said hubs are journaled, respectively, each support having an annular space formed therein, and the exterior walls of said hubs being apertured respectively, in alinement with said respective annular spaces, a conduit for supplying fluid to one of said annular spaces, and a conduit for conducting away fluid from the other of said annular spaces.

15. In an apparatus of the kind described, the combination with a closed rotary container having double walls with a space between, a double walled hub at the end of the axis of said container, and its interior communicating with the space between the container walls, a support upon which said hub is journaled, said support having an annular space formed therein, and the exterior wall of said hub having an opening therein in alinement with said annular space, and a conduit for supplying fluid to said annular space, and a conduit within said hub for admitting fluid to the interior of said container.

16. In an apparatus of the kind described, the combination with a closed rotary container having double walls with a space between, a double walled hub at the end of the axis of said container, and its interior communicating with the space between the container walls, a support upon which said hub is journaled, said support having an annular space formed therein, and the exterior wall of said hub having an opening therein in alinement with said annular space, a conduit for supplying fluid to said annular space, a core within said hub fixed against rotation, and a conduit within said core for admitting fluid to the interior of said container.

17. In an apparatus of the kind described, the combination with a closed rotary container having double walls with a space between, double walled hubs at the ends of the axis of said container, and with their interiors communicating with the space between the container walls, supports upon which said hubs are journaled, respectively, each support having an annular space formed therein, and the exterior walls of said hubs being apertured, respectively, in alinement with said respective annular spaces, a conduit for supplying fluid to one of said annular spaces, a conduit for conducting away fluid from the other of said annular spaces, a conduit within one of said hubs for admitting fluid to the interior of said container and a conduit within the other of said hubs for conducting fluid away from the interior of said container.

18. In an apparatus of the kind described, the combination with a closed cylindrical container rotatable about an axis, substantially coincident with its cylindrical axis, a conduit for admitting fluid into the container at the axis, said conduit terminating substantially at the point of entry into said container, a spreading device within the container, said spreading device being broad at one end and converging to an apex at the other end, said apex being substantially in line with but separated from said conduit, and having its surface outwardly inclined, whereby the fluid from said conduit impinges upon said spreader and is spread through the interior of the container.

19. In an apparatus of the kind described, the combination with a closed cylindrical container rotatable about an axis substantially coincident with its cylindrical axis, a conduit for admitting fluid into the container at the axis, said conduit terminating substantially at the point of entry into said container, a spreading device within the container, said spreading device being broad at one end and converging to an apex at the other end, said apex being substantially in line with but separated from said conduit and having its surface outwardly inclined, whereby the fluid from said conduit impinges upon said spreader and is spread through the interior of the container, and an egress conduit at the opposite axis and a baffle within said container in front of said egress conduit but spaced away therefrom.

20. In an apparatus of the kind described, the combination with a closed cylindrical horizontally arranged rotary container, having double walls with a space between, means at one end of the axis of said container for supplying fluid to the interior of the container while rotating, means for circulating a fluid through the space between the walls of said container while rotating, a stationary casing inclosing said container, heating means within said stationary casing and beneath said container, a closure in the casing and a cover in said container positionable beneath said closure, and means for holding said cover in closed position.

21. In an apparatus of the kind described, the combination with a closed rotary container, of a conduit for admitting fluid at one end of the axis of said container, said conduit terminating adjacent to its point of entry into said container, and a cone shaped spreader with its apex pointed toward and located adjacent to the terminus of said conduit for spreading the fluid transversely to all parts of the container, a central portion of said container being open space free from obstruction.

22. In an apparatus of the kind described a rotary closed container, a plurality of conduits for admitting fluids into said container, and a common spreading device for said conduits within said chamber.

23. In an apparatus of the kind described a rotary closed container, a plurality of conduits for admitting fluids into said container and a single egress conduit from the other axis of said container.

24. In an apparatus of the kind described a rotary closed container, a plurality of conduits for admitting fluids into said container and a single egress conduit from the other axis of said container, and means for preventing solids from said container entering said egress conduit while permitting fluids from the container to enter said egress conduit.

25. In an apparatus of the kind described, a rotary closed container, a plurality of conduits for admitting fluids into said container and a common spreading device for said conduits within said chamber, and a single egress conduit from the other axis of said container.

26. In an apparatus of the kind described, a rotary closed container, a plurality of conduits for admitting fluids into said container and means for heating the fluids entering said conduits and for separately regulating the heat applied to the various fluids.

27. In an apparatus of the kind described, a closed rotary container, a plurality of conduits entering said container at one of its axial bearings, and a conical spreader within said container having its apex substantially centered with respect to said plurality of conduits.

28. In an apparatus of the kind described a closed rotary container, a plurality of stationary conduits entering said container at one of its axial bearings and a common spreading device for all of said conduits, said spreading device being mounted upon said container and rotating therewith.

In testimony whereof, we have signed our names to this specification, in the presence of two subscribing witnesses.

OSCAR T. ZINKEISEN.
ROBERT N. RIDDLE.

Witnesses:
JOHN D. MORGAN,
ROSE MENK.